(12) United States Patent
Saka et al.

(10) Patent No.: US 7,394,018 B2
(45) Date of Patent: Jul. 1, 2008

(54) AUTOMOTIVE ELECTRICAL CONNECTION BOX

(75) Inventors: Yukinori Saka, Yokkaichi (JP); Tooru Nakagawa, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 726 days.

(21) Appl. No.: 10/990,727

(22) Filed: Nov. 17, 2004

(65) Prior Publication Data

US 2005/0181644 A1    Aug. 18, 2005

(30) Foreign Application Priority Data

Feb. 13, 2004    (JP)    ............................. 2004-037416

(51) Int. Cl.
  *H02G 3/08*    (2006.01)
  *H01R 12/00*    (2006.01)
(52) U.S. Cl. .................. 174/50; 174/520; 174/562; 439/76.1; 439/76.2
(58) Field of Classification Search ............... 174/50, 174/59, 559, 58, 53, 17 R, 54, 61, 650, 480, 174/520, 562, 563, 561; 439/76.1, 76.2, 439/701, 949, 557, 638, 248; 361/600, 601, 361/752, 729; 403/408.1
See application file for complete search history.

(56) References Cited

U.S. PATENT DOCUMENTS

| | | | | |
|---|---|---|---|---|
| 4,811,168 A | * | 3/1989 | Chesnut et al. | ............ 439/76.1 |
| 5,023,752 A | * | 6/1991 | Detter et al. | ................ 439/76.2 |
| 5,271,689 A | * | 12/1993 | Ishii et al. | ................ 403/408.1 |
| 5,771,151 A | * | 6/1998 | Hotea et al. | .................. 361/729 |
| 6,027,360 A | * | 2/2000 | Jenkins | ........................ 439/248 |
| 6,443,779 B2 | * | 9/2002 | Suzuki | ....................... 439/76.2 |
| 6,570,088 B1 | * | 5/2003 | Depp et al. | .................... 174/50 |
| 6,930,248 B1 | * | 8/2005 | Saka et al. | ..................... 174/50 |

FOREIGN PATENT DOCUMENTS

| | | |
|---|---|---|
| JP | 8-339866 | 12/1996 |
| JP | 10-302887 | 11/1998 |

\* cited by examiner

*Primary Examiner*—Angel R Estrada
(74) *Attorney, Agent, or Firm*—Gerald E. Hespos; Anthony J. Casella (57) ABSTRACT

Upper and lower casings (10, 11) are coupled together and are fixed to a holder (20) by a bolt (B). The upper casing (10) has an upper wall (10*b*) with a bolt hole (11*c*) and the lower casing (11) has a bottom wall (11*b*) with a bolt hole (11*c*). A cylindrical collar (15) is molded with the bottom wall (11*b*) of the lower casing (11) and projects from the edge of the bolt hole (11*c*). The collar (15) has a length to penetrate through the bolt hole (10*c*) in the upper wall (10*b*) of the upper casing (10). The collar (15) has a step (15*a*) for supporting a lower surface of a bolt head (Bb) of the bolt (B) and inward projection (15*b*) for engaging an upper surface of the bolt head (Bb). Thus, the bolt head (Bb) is held rotatably between the step (15*a*) and the inward projection (15*b*).

18 Claims, 7 Drawing Sheets

AUTOMOTIVE ELECTRICAL CONNECTION BOX

BACKGROUND OF THE INVENTION

1. Field of the Invention

The invention relates to an automotive electrical connection box.

2. Description of the Related Art

Figure 6:
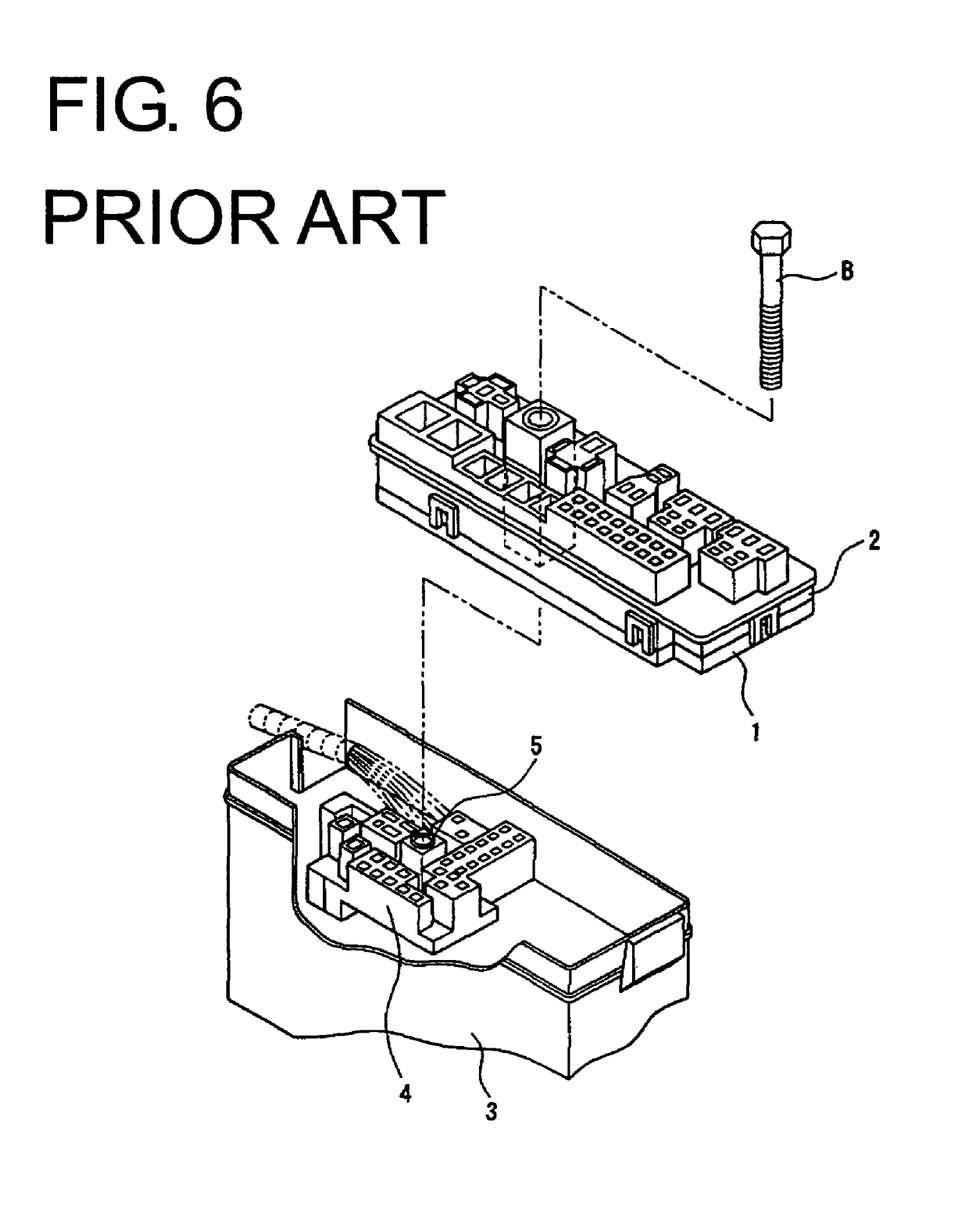
FIG. 6 is an exploded perspective view of a prior art electrical connection box.

Japanese Unexamined Patent Publication H10-302887 and FIG. 6 herein disclose an automotive electrical connection box. With reference to FIG. 6, the electrical connection box has a lower casing 1 and an upper casing 2 with surrounding walls that are coupled together. The coupled casings 1 and 2 are mounted to a lower cover 3. Connectors 4 are provided in the lower cover 3 and at least partly surround a bolt insertion portion 5. A bolt B is introduced through the casings 1, 2 and is screwed into the bolt inserting portion 5. Thus, the coupled lower and upper casings 1, 2 are fixed to the lower cover 3.

The bolt B can be detached upward to release the lower and upper casings 1, 2 from the fixed state. Thus, the lower and upper casings 1, 2 can be detached integrally from the lower cover 3.

However, the lower and upper casings 1, 2 are not raised automatically and detached from the lower cover 3 as the bolt B is detached. Thus, an operator must perform additional steps to detach the lower and upper casings 1, 2 from the lower cover 3.

The bolt B is not assembled with the lower and upper casings 1, 2 beforehand. Rather, the bolt B must be inserted through the assembled casings 1, 2 to fix the casings 1, 2 to the lower cover 3. Accordingly, a parts administration problem exists.

Figure 7:
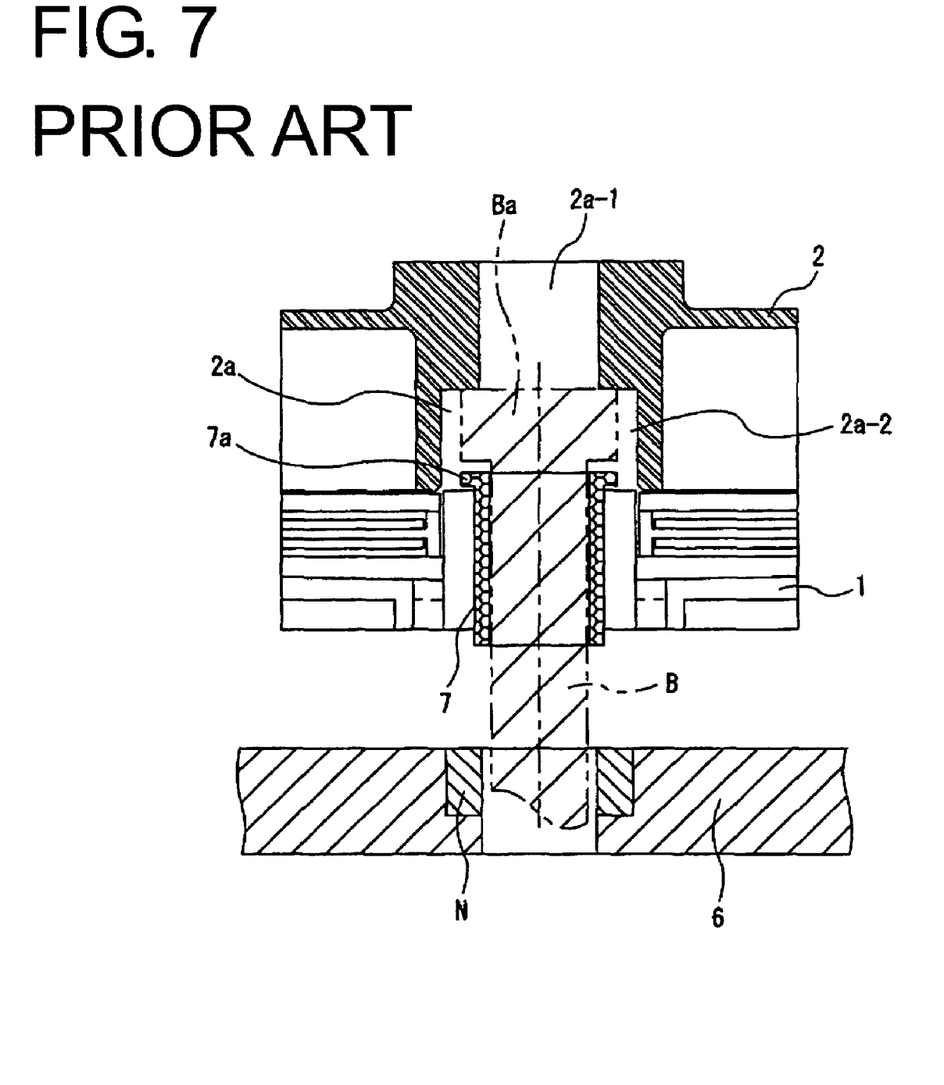
FIG. 7 is a section of another prior art electrical connection box.

FIG. 7 shows an electrical connection box that has been proposed to avoid the above-described problems. More particularly, the proposed electrical connection box enables a lower casing 1 and an upper casing 2 to be detached from a fixing member simultaneously with a bolt detaching operation and also enables a bolt to be assembled with the lower and upper casings 1 and 2 beforehand. The lower and upper casings 1, 2 are coupled lockingly together by locks on their surrounding walls and are fixed to a fixing member 6, such as a vehicle body, a holder or a lower cover by a bolt B that is introduced into substantially center portions of the casings 1, 2 beforehand.

The bolt B is introduced through a collar 7 that extends from the peripheral edge of a bolt hole of the lower casing 1. The upper casing 2 is formed integrally with a bolt inserting portion 2a. An upper part of the bolt insertion portion 2a is a small hole 2a-1 and the lower part of the bolt inserting portion 2a is a large hole 2a-2. The step between the small and large holes 2a-1 and 2a-2 contacts the upper surface of a head Ba of the bolt B. The large hole 2a-2 surrounds the outer peripheral surface of the bolt head Ba with a clearance. The bolt B is assembled beforehand so that the upper and lower surfaces of the head Ba are held rotatably between the step adjacent the small hole 2a-1 and the upper end surface of a flange 7a of the collar 7.

An impact wrench (not shown) can be inserted into the small hole 2a-1 of the bolt inserting portion 2a of the upper casing 2 from above to turn the head Ba of the bolt B and to screw the bolt B down into a nut N embedded in the fixing member 6. Thus the casings 1, 2 are fixed to the fixing member 6.

The impact wrench also can be inserted into the bolt inserting portion 2a of the upper casing 2 from above to turn the bolt head Ba in a reverse direction. As a result, the bolt B is raised and disengaged from the nut N. Additionally, the upper end surface of the bolt head Ba pushes up against the step below the small hole 2a-1 of the upper casing 2. Thus, the upper casing 2 is moved up and away from the fixing member 6. The lower casing 1 is coupled to the upper casing 2 and hence moves up with the upper casing 2. Accordingly, the lower and upper casings 1, 2 are intended to be detached integrally from the fixing member 6.

The casings 1, 2 may be large and the single bolt B may be spaced from the locks on the surrounding walls. Thus, the bolt B pushes up only a middle part of the upper casing 2. Accordingly, a part of the upper casing 2 near the bolt may deform up, and the locks on the surrounding walls may disengage from the lower casing 1 due to this deformation of the upper casing 2. As a result, only the upper casing 2 may detach with the bolt B, and the lower casing 1 may remain fixed to the fixing member 6.

Further, the upper and lower casings are coupled only at the surrounding walls, even in a bolt-fastened state. Accordingly the upper and lower casings are likely to shake with respect to each other at the middle parts distanced from the surrounding walls of large electrical connection box.

The invention was developed in view of the above problems, and an object thereof is to improve operability during the mounting/dismounting of the electrical connection box to a fixing member, such as a holder.

SUMMARY OF THE INVENTION

The invention relates to an electrical connection box with first and second casings that are coupled together and that are fixed to a fixing member, such as a vehicle body panel. A bolt is mounted rotatably in the casings. More particularly, a bolt hole is formed in a wall of the second casing and a holder is introduced through the bolt hole. The wall of the second casing is molded with a collar that projects from a peripheral edge of the bolt hole. The collar is dimensioned to penetrate through the inside of the second casing, through the inside of the first casing and through a bolt hole formed in a wall of the first casing. The head of the bolt is held rotatably along an axial direction thereof by the collar, and the collar is pushed up by the bolt to detach the coupled first and second casings simultaneously from the fixing member when the bolt is detached up and away from the fixing member.

At least one step and at least one inwardly-projecting locking claw project from the inner surface of the collar. The step supports a surface of a head of the bolt and the locking claw is engageable with a substantially opposite surface of the head of the bolt.

The inwardly-projecting locking claw of the collar preferably is pushed up by the head of the bolt to detach the coupled casings simultaneously from the fixing member when the bolt is detached from the fixing member. With this construction, the inward-projecting locking claw of the collar is pushed up when the bolt is raised. Thus, the entire lower casing provided with the collar is pushed up away from the fixing member. The casings are coupled together and hence are detached together from the fixing member as part of the bolt detaching operation.

An outward-projecting locking claw preferably is provided at the end of the collar and engages the wall of the first casing at the peripheral edge of the bolt hole. The locking claw holds the wall of the first casing in a bolt-fastened state of the casings. Additionally, the casings are coupled at their surrounding walls. Thus, even large casings will not shake with respect to each other over.

The first casing is locked by the outward-projecting locking claw of the collar even when the bolt is being detached. Thus, the first casing will not deform in a way that will free the casings from their locked state. As a result, the casings can be detached integrally.

One single bolt preferably is mounted at substantially center positions of the first and second casings.

At least one lock preferably is provided on the surrounding walls of the casings spaced from the bolt to lockingly couple the casings together.

Two or more bolts may be provided, and each bolt may be spaced from the locks on the surrounding walls.

The collar standing from the wall of the second casing may have the step for supporting the surface of the head of the bolt. Several inward-projecting locking claws may be spaced circumferentially from each other on a surface of the step and may engage the opposite surface of the head of the bolt. Further, the outward-projecting claw may be at the end of the collar.

A metallic bush may be disposed inside the collar in the second casing, and a flange at the end of the bush may be placed on the surface of the step of the collar to cause the flange to contact and support the surface of the head of the bolt.

A head of the bolt preferably is inside the collar and exposed to the outside at a position registered with the bolt hole of the first casing or cover.

The second housing preferably comprises at least one mounting portion for mounting a connector to the second housing.

An uneven number of mounting portions may be provided in the second housing. In this situation, at least one dummy portion is provided on the second housing at a position substantially symmetric to the mounting portion that has no symmetric pair. Thus, stresses are substantially balanced during fastening by the bolt.

At least one protection rib preferably projects from the first wall of the first casing near the peripheral edge of the bolt hole.

The casings of the above-described electrical connection box can be coupled lockingly to each other and then can be detached from the fixing member in synchronism with the bolt detaching operation. Thus, the casings need not be detached from the fixing member after the bolt is detached and operational efficiency is improved.

The bolt is mounted rotatably beforehand in the casings, and it is sufficient to insert an impact wrench through the bolt hole of the first casing and turn the impact wrench either to fix or detach the casings to or from the fixing member. In this respect, the operation efficiency can be improved.

These and other objects, features and advantages of the present invention will become more apparent upon reading of the following detailed description of preferred embodiments and accompanying drawings. It should be understood that even though embodiments are described separately, single features thereof may be combined to additional embodiments.

DETAILED DESCRIPTION OF THE PREFERRED EMBODIMENTS

Figure 1:
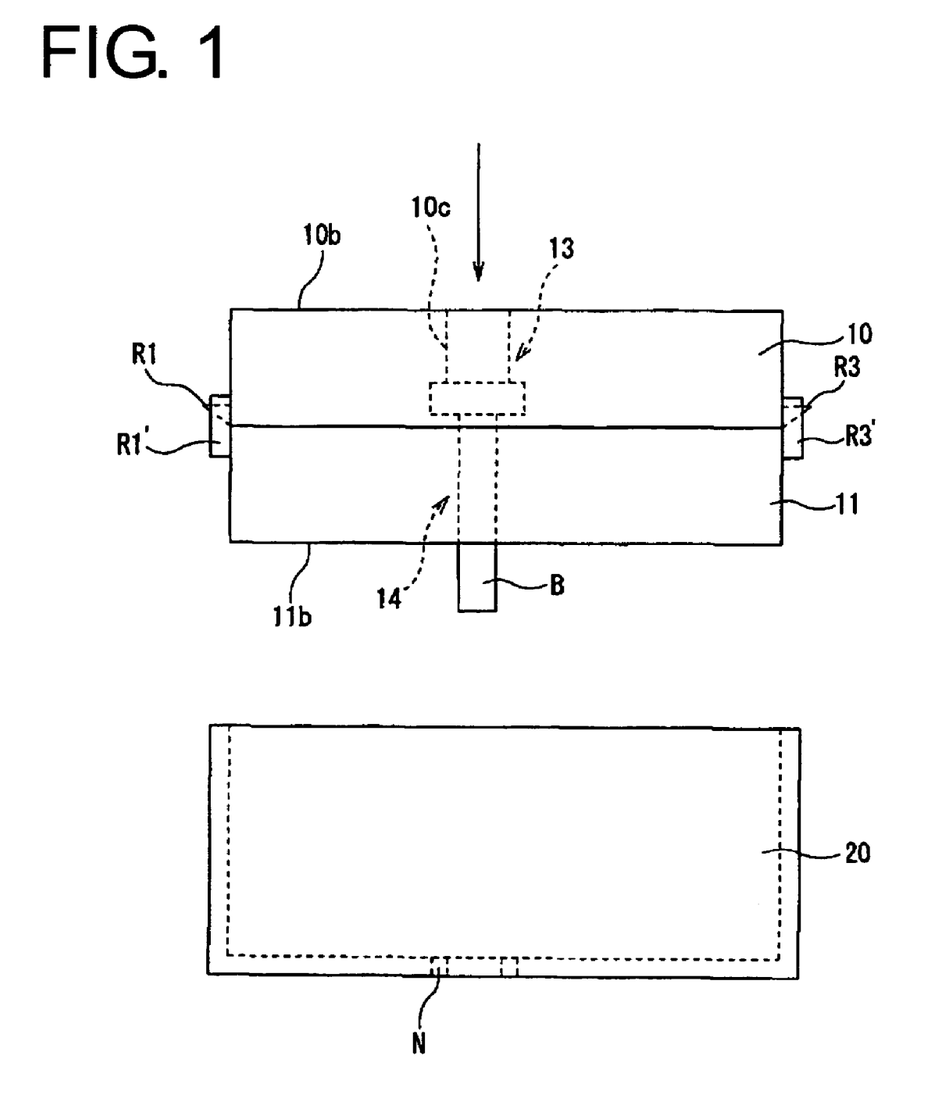
FIG. 1 is a schematic diagram of one embodiment of the invention.

FIG. 1 is a schematic diagram showing first and second casings 10 and 11 and a holder 20. The casings 10 and 11 are coupled together beforehand and, in this embodiment, are fixed to the holder 20 by engaging a bolt B with a nut N embedded in the bottom wall of the holder 20. However, the casings 10, 11 may be fixed to a vehicle body instead of the holder 20.

Bolt mounting portions 13, 14 are provided in a substantially central portion of a first wall 10b of the first casing 10 and in a substantially central portion of a second wall 11b of the second casing 11. The bolt B is held rotatably in the bolt mounting portions 13, 14. A tool, such as an impact wrench (not shown), can be inserted through a bolt hole 10c in a central portion of the first wall 10b of the first casing 10 to turn a head Ba of the bolt B, thereby engaging the bolt B with the nut N embedded in the holder 20 or disengaging the bolt B from the nut N.

The bolt B is mounted at substantially central portions of the first and second casings 10, 11. Thus, the mounted position of the bolt B is distanced from surrounding walls 10a, 11a.

Locks R1-R5 are provided on the two longer sides of the surrounding wall 10a of the first casing 10, whereas engaging portions R1'-R5' are provided at corresponding positions of the surrounding wall 11a of the second casing 11.

The surrounding wall 10a of the first casing 10 is fit into the surrounding wall 11a of the second casing 11, and the locks R1-R5 engage the engaging portions R1'-R5' to couple the casings 10, 11 together.

A substantially cylindrical tubular collar 15 is molded unitarily to project from the peripheral edge of a bolt hole 11c of the second wall 11b of the first casing 11. The collar 15 has a length to penetrate through the inside of the second casing 11, the inside of the first casing 10 and the bolt hole 10c of the first wall 10b of the first casing 10. A metallic bush 18 is pressed into the collar 15 in the second casing 11 or insert-molded with the second casing 11. A flange 18a is formed at one distal end of the bush 18.

Figure 2A:
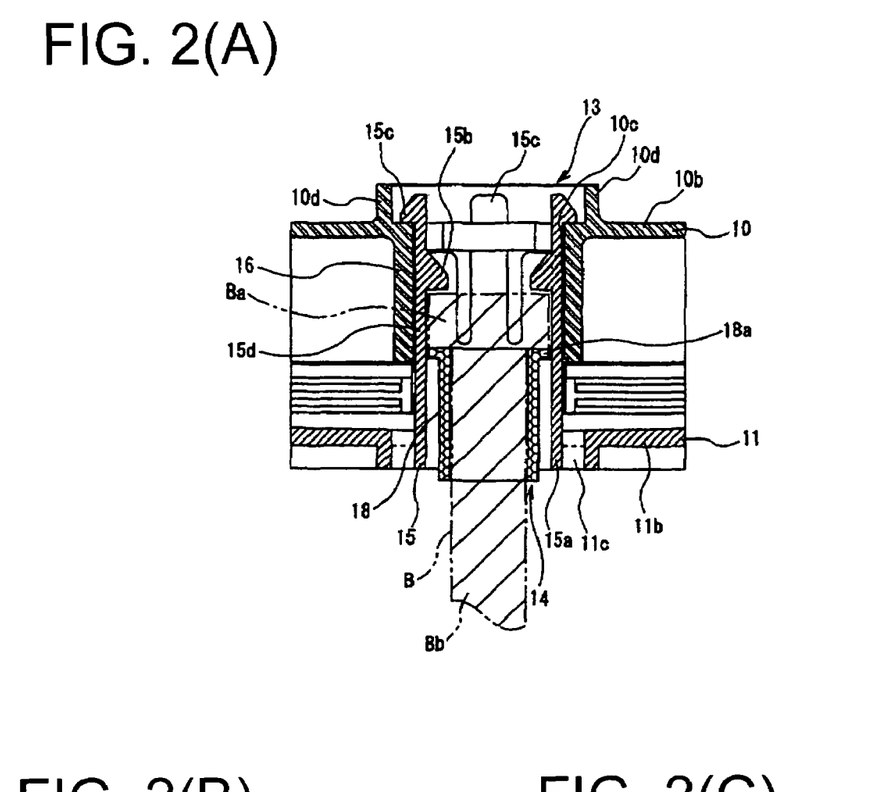
FIG. 2(A) is a section showing an essential portion of the embodiment.
Figure 2B:
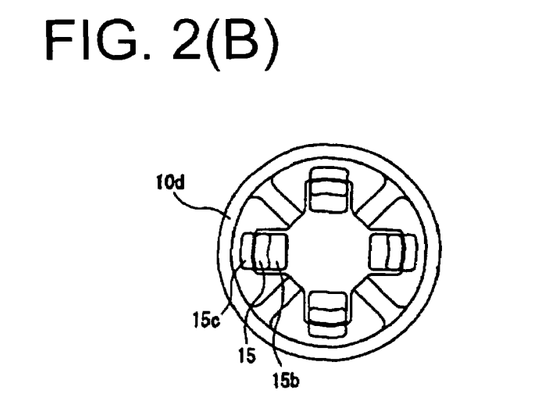
FIG. 2(B) is a plan view showing bolt mounting portions.
Figure 2C:
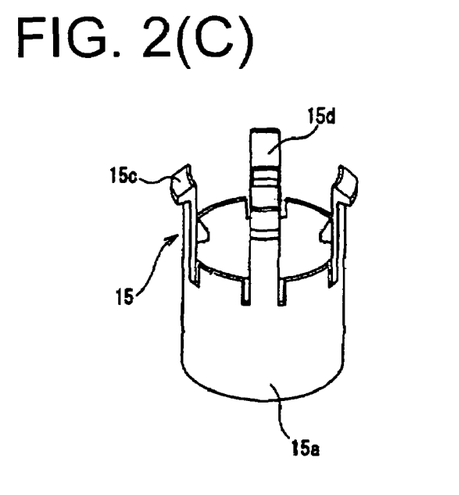
FIG. 2(C) is a perspective view of a collar portion.
Figure 3:
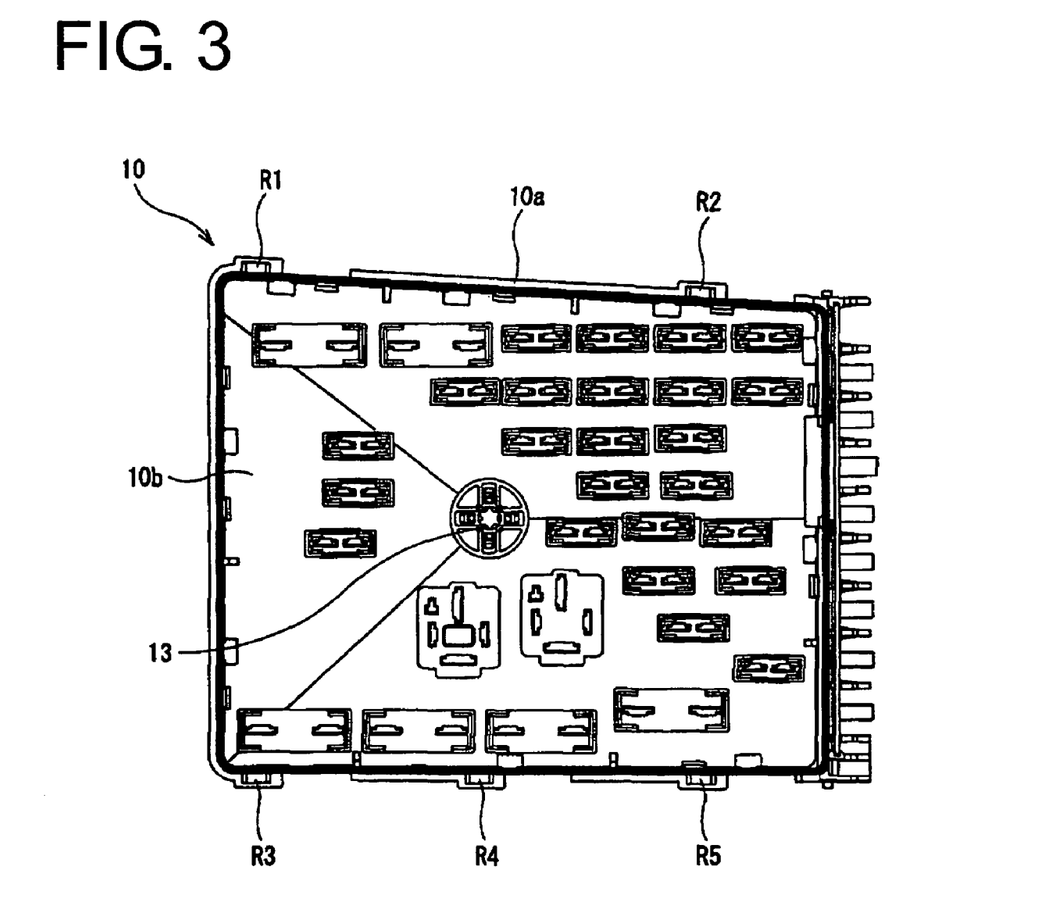
FIG. 3 is a plan view of an upper casing of the invention.

The collar 15 has a step 15a, as shown in FIG. 2(C), and the lower surface of the flange 18a of the bush 18 is supported by the upper end of the step 15a to hold the flange 18a in contact with the lower surface of the bolt head Ba. Thin projections 15d extend from circumferentially spaced positions of the step 15a and have outer surfaces substantially flush with the outer surface of the step 15a. Locking claws 15b project in from longitudinal middle positions of the projections 15d for engaging the upper surface of the bolt head Ba.

The flange 18a and the locking claws 15b are spaced apart by a distance substantially corresponding to the longitudinal extension of the bolt head Ba (refer e.g. to FIG. 2(A)). Thus, the bolt head Ba is held rotatably between the inward-projecting locking claws 15b and the flange 18a of the bush 18, which is supported by the step 15a. Outward-projecting locking claws 15c are formed at distal ends of the respective projecting pieces 15d. The outward-projecting locking claws 15c engage the peripheral surface of the upper end of the bolt hole 10c of the first casing 10.

A cylindrical portion 16 projects down from the periphery of the bottom end of the bolt hole 10c of the first casing 10 and fits around the collar 15. Further, a protection rib 10d projects from the first surface of the first wall 10b around the peripheral edge of the bolt hole 10c outwardly from an area engaged by the outward-projecting locking claws 15c.

Figure 4:
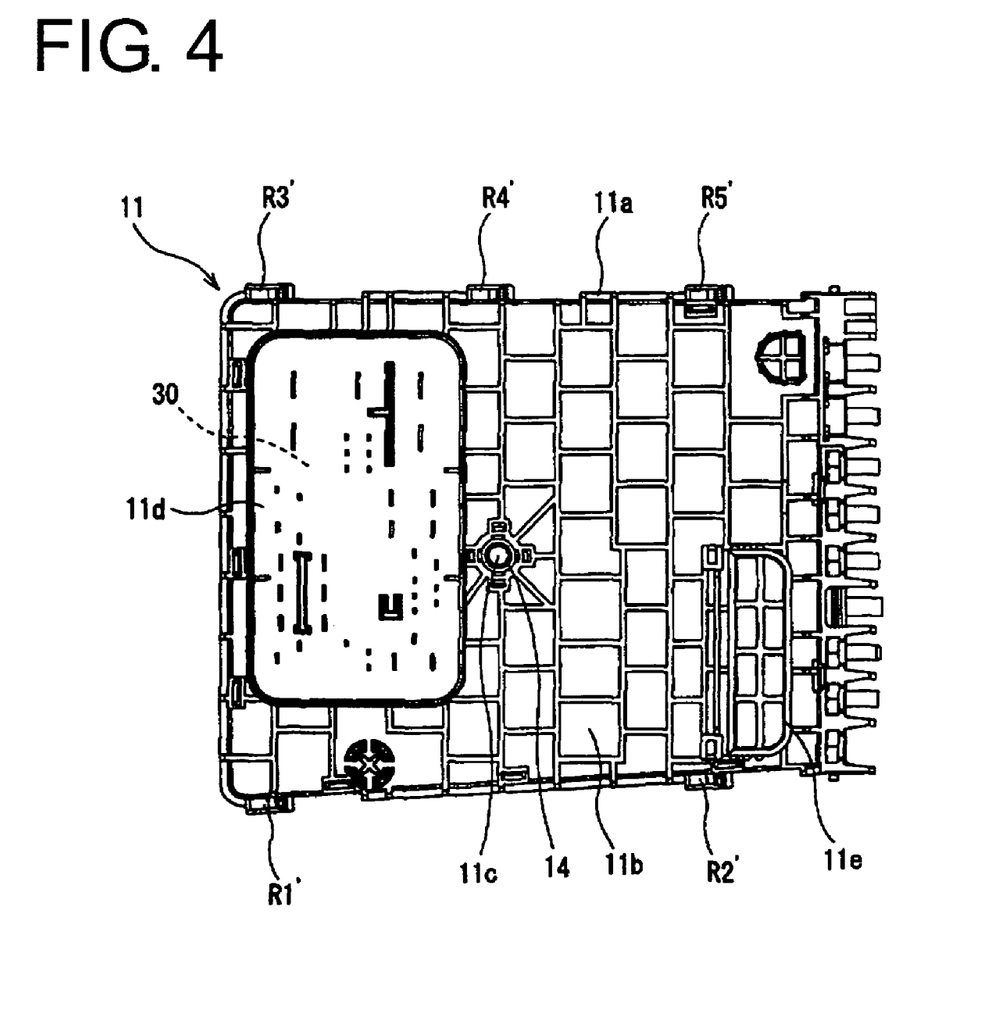
FIG. 4 is a bottom view of a lower casing of the invention.

A mounting portion 11d projects from the second casing 11 at one side of the collar 15, as shown in FIG. 4, so that the mating connector 30 can be connected with the waiting-side connector 21 substantially simultaneously with the fastening by the bolt B.

Figure 5:
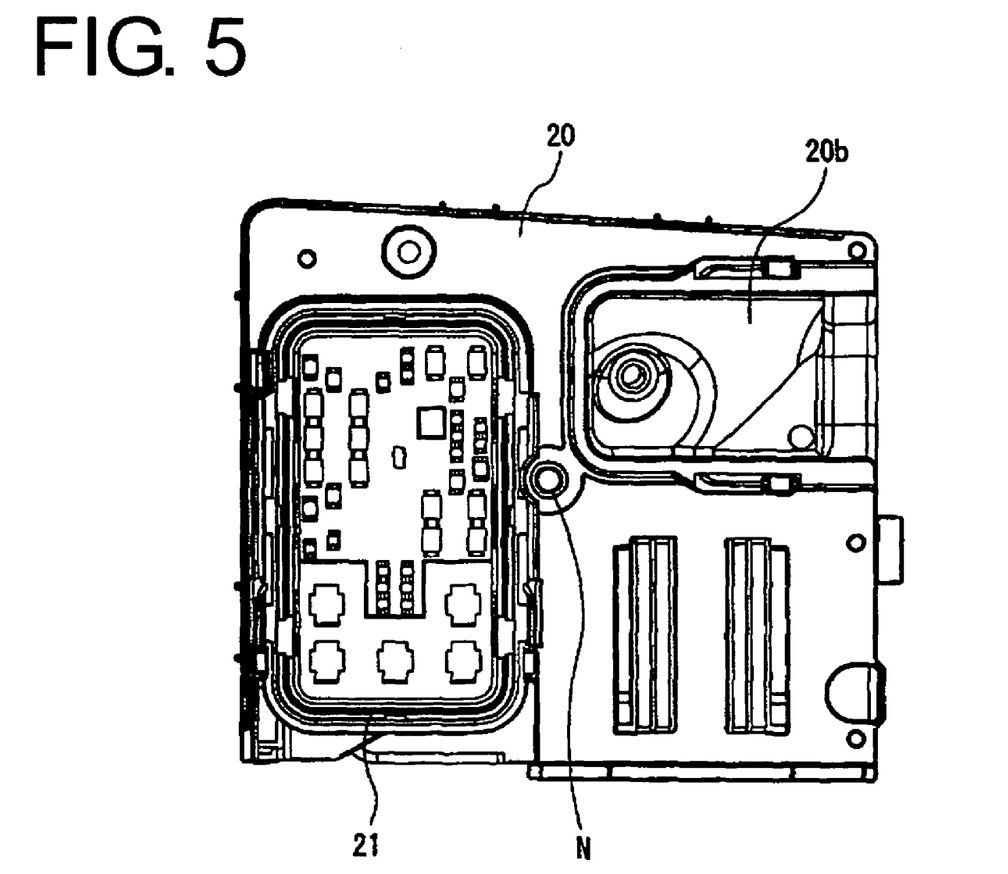
FIG. 5 is a plan view of a holder of the invention.

A connecting portion of the waiting-side connector 21 and the mating connector 30 are at only one side of the bolt B. However, a dummy housing 11e projects in the lower casing 11 at the other side of the bolt B and an opening 10e is formed in the holder 20 to receive the dummy housing 11e and to substantially balance stresses created as the bolt B is fastened. As a result, the mating connector 30 can be connected properly with the waiting-side connector 21 without being obliquely inserted.

A shaft Bb of the bolt B is inserted into the collar 15 of the second casing 11 from a side of the first casing 10 to engage the inward-projecting locking claws 15b and to deform the thin projecting pieces 15d of the collar 15 outwardly. Insertion of the bolt B is stopped when the bolt B is below the inward-projecting locking claws 15a, and the lower surface of the bolt head Ba contacts the flange 18a of the bush 18 that has been supported by the step 15a of the collar 15. In this state, the opposite surfaces of the bolt head Ba are held rotatably between the inward-projecting locking claws 15b and the step 15a. Although the bolt head Ba is inside the collar 15, it may be exposed to the outside at a position facing the bolt hole 10c of the upper casing 10.

The cylindrical portion 16 of the first casing 10 is lowered and engages the outward-projecting locking claws 15c on the thin projecting pieces 15d at the distal end of the collar 15. Thus, the thin projecting pieces 15d deform resiliently inward. Consequently the cylindrical portion 16 of the first casing 10 is fit around the collar 15. The outward-projecting locking claws 15c engage the surface of the first casing 10 around the peripheral edge of the bolt hole 10c when the first casing 10 is assembled to a specified position. In this state, the locks R1 to R5 to engage the respective engaging portions R1' to R5' on the surrounding walls engage to couple first and second casings 10, 11.

The bolt B is held rotatably and the bolt shaft Bb projects down towards the holder 20 from the second casing 11 inside the locked casings 10, 11.

The lockingly coupled casings 10, 11 next are fixed to the holder 20. More particularly, the distal end of the bolt shaft Bb projects from the second casing 11 and is inserted into the nut N of the holder 20. A tool, such as the impact wrench (not shown), is inserted into the bolt hole 10c of the first casing 10. The leading end of the impact wrench engages a groove in the upper surface of the bolt head Ba and turns the bolt B to engage the nut N and to fix the second and first casings 11, 10 to the holder 20.

The outward-projecting locking claws 15c at the upper end of the collar 15 engage the first surface of the first casing 10 to prevent the casings 10, 11 from shaking with respect to each other.

The impact wrench or other tool can be inserted into the bolt hole 10c of the first casing 10 from above and turned in a reverse direction to disengage the bolt B from the nut N and to detach the casings 10, 11 from the holder 20.

The bolt head Ba pushes the inward-projecting locking claws 15b up as the bolt B is raised, thereby pushing the second casing 11 up. At this time, the outward-projecting locking claws 15c at the end of the collar 15 engage the upper wall 10b of the first casing 10. Thus, the first casing 10 is prevented from being separated from the second casing 11.

The second casing 11 is pushed up as the bolt B is disengaged from the nut N. The first casing 10 is coupled lockingly to the second casing 11, and thus is pushed up together with the second casing 11. As a result, the casings 10, 11 are detached from the holder 20 as the bolt B is detached.

As described above, the second casing 11 or the intermediate casing 11 between the outer casing 10 and the holder 20 is pushed up and detached from the holder 20 as the bolt is raised. Thus, the first casing 10 is pushed up entirely uniformly by the second casing 11.

Only one bolt B may be mounted at the central portion of the first and second casings 10, 11 and the locks of the casings 10, 11 are distanced from the bolt B. However, the casings 10, 11 can be detached integrally from the holder 20 without being freed from their locked state, and the second casing 11 will not be left fixed to the holder 20.

The bolt B is mounted in the casings 11, 10 beforehand and the casings 10, 11 can be detached as the bolt B is detached. Thus, the casings 10, 11 can be fixed easily to and detached from the holder 20 only by inserting and turning the impact wrench or other such tool.

The lockingly coupled casings 10, 11 are fixed to the holder 20 in the foregoing embodiment. However, the invention also is applicable to a case where they are directly fixed to a vehicle body panel or the like.

What is claimed is:

1. An electrical connection box with a first casing and a second casing to be lockingly coupled together, a bolt rotatably mounted in the first and second casings, the bolt being formed with a head, the first and second casings being fixed to a holder by the bolt introduced through a bolt hole in a wall of the second casing, comprising:

a collar projecting from a peripheral edge of the bolt hole in the wall of the second casing, the collar having a length to penetrate through the inside of the second casing, the inside of the first casing and a bolt hole formed in a wall of the first casing, the collar holding the head of the bolt rotatably along an axial direction thereof; and the collar being configured to be pushed up by the bolt to detach the coupled first and second casings from the fixing member holder simultaneously when the bolt is detached.

2. The electrical connection box of claim 1, wherein an inner circumferential surface of the collar has at least one step for supporting a first surface of a head of the bolt and at least one inward-projecting locking claw engageable with a second surface of the head of the bolt substantially opposite the first surface thereof.

3. The electrical connection box of claim 2, wherein the inward-projecting locking claw of the collar is pushed up by the head of the bolt to simultaneously detach the coupled first and second casings from the holder when the bolt is detached.

4. The electrical connection box of claim 1, wherein at least one outward-projecting locking claw is provided at a distal end of the collar and is engageable with the wall of the first casing at the peripheral edge of the bolt hole for holding the wall of the first casing in a bolt-fastened state of the first and second casings.

5. The electrical connection box of claim 1, wherein a single bolt is mounted substantially a center of the first and second casing.

6. The electrical connection box of claim 1, wherein at least one locking portion is provided on the surrounding walls of the first and second casings distanced from a bolt-fastened position to lockingly couple the first and second casings to each other.

7. The electrical connection box of claim 1, wherein a bolt head of the bolt is located inside the collar and is exposed to the outside at a position substantially facing the bolt hole of the first casing.

8. The electrical connection box of claim 1, wherein the second casing comprises at least one mounting portion for mounting a connector to the second casing.

9. The electrical connection box of claim 8, wherein an uneven number of mounting portions are provided in the second casing and at least one dummy is provided on the second casing at a position with respect to collar to substantially balance stresses created during fastening by the bolt in the collar.

10. The electrical connection box of claim 1, wherein at least one protection rib projects from the wall of the first casing at least partly around a peripheral edge of the bolt hole in the wall of the first casing.

11. An electrical connection box comprising:
a casing having a wall with a bolt hole formed therethrough, a collar projecting from the wall and substantially surrounding the bolt hole, the collar having outwardly projecting locks spaced from the wall, inwardly projecting locks between the outwardly projecting locks and the wall, and a step disposed so that the inwardly projecting locks are between the outwardly projecting locks and the step;
a bolt having a shaft passing through the bolt hole and a head sandwiched between the step and the inwardly projecting locks of the collar; and
a cover mounted to the casing and having a cover wall substantially opposed to the wall of the casing, a cover bolt hole formed through the cover wall and substantially registered with the head of the bolt, surface areas of the cover wall facing away from the casing and in proximity to the cover bolt hole being engaged by the outwardly projecting locks of the collar.

12. The electrical connection box of claim 11, wherein the casing has a surrounding wall extending from the wall, and the cover has a surrounding wall extending from the cover wall, the surrounding walls of the cover and the casing being coupled together.

13. The electrical connection box of claim 12, wherein locks are provided on the surrounding walls of the casing and the cover to lockingly couple the cover to the casing.

14. The electrical connection box of claim 11, wherein the casing comprises at least one mounting portion for mounting a connector to the casing.

15. The electrical connection box of claim 14, wherein an uneven number of mounting portions are provided in the casing and at least one dummy is provided on the casing at a position with respect to collar to substantially balance stresses created during fastening by the bolt in the collar.

16. The electrical connection box of claim 11, wherein the collar has thin projections projecting away from the step, the inwardly projecting locks and the outwardly projecting locks being on the thin projections.

17. The electrical connection box of claim 16, wherein the inwardly projecting locks have slanted surfaces facing away from the wall of the casing for generating outward deflection of the thin projections during insertion of the head of the bolt.

18. The electrical connection box of claim 16, wherein the outwardly projecting locks have slanted surfaces facing away from the wall of the casing for generating inward deflection of the thin projections during mounting of the cover to the casing.

* * * * *